United States Patent

Kricheff et al.

(10) Patent No.: US 6,324,627 B1
(45) Date of Patent: *Nov. 27, 2001

(54) VIRTUAL DATA STORAGE (VDS) SYSTEM

(75) Inventors: David Nathan Kricheff, Closter, NJ (US); Colin Constable, Purley (GB); Charles Thomas Gambetta, Massapequa Park, NY (US)

(73) Assignee: Virtual Data Security, LLC, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,802

(22) Filed: Jun. 2, 1999

Related U.S. Application Data

(63) Continuation-in-part of application No. 09/102,520, filed on Jun. 22, 1998, now abandoned.

(51) Int. Cl.[7] .................................................. G06F 12/16
(52) U.S. Cl. ........................................ 711/163; 711/173
(58) Field of Search ........................... 711/4, 5, 111–112, 711/114, 152–153, 163, 170–171, 173, 202–203, 154, 164; 713/1, 2, 100, 200; 714/769–770

(56) References Cited

U.S. PATENT DOCUMENTS

| | | | |
|---|---|---|---|
| 5,129,088 | 7/1992 | Auslander et al. | 395/700 |
| 5,519,844 | 5/1996 | Stallmo | 395/441 |
| 5,586,301 | 12/1996 | Fisherman et al. | 395/479 |
| 5,657,470 | 8/1997 | Fisherman et al. | 395/480 |
| 5,657,473 | * 8/1997 | Killean et al. | 711/163 |
| 5,675,769 | 10/1997 | Ruff et al. | 395/497.01 |
| 5,706,472 | 1/1998 | Ruff et al. | 395/497.01 |
| 5,721,877 | 2/1998 | Heflinger et al. | 395/500 |
| 5,758,050 | 5/1998 | Brady et al. | 395/180 |
| 5,829,053 | 10/1998 | Smith et al. | 711/202 |
| 5,928,327 | * 7/1999 | Wang et al. | 709/217 |
| 6,052,781 | * 4/2000 | Weber | 713/200 |
| 6,067,618 | * 5/2000 | Weber | 713/1 |

* cited by examiner

*Primary Examiner*—Matthew Kim
*Assistant Examiner*—Denise Tran
(74) *Attorney, Agent, or Firm*—Baker Botts L.L.P.

(57) ABSTRACT

A Virtual Disk Storage (VDS) System for providing multiple virtual data storage devices for use in a computer system which contains a central processing unit (CPU). The VDS System includes a memory system for storing information and a VDS Controller which is in communication with the memory system and the CPU. The VDS Controller partitions the memory system into multiple virtual data storage devices, and then restricts the computer system from communicating with certain of these virtual data storage devices. The VDS Controller thus selectively isolates at least one of the virtual data storage devices from communicating with the computer system, in order to prevent corruption of information stored in at least one virtual data storage device.

51 Claims, 5 Drawing Sheets

VIRTUAL DATA STORAGE (VDS) SYSTEM

This application is a continuation-in-part of U.S. patent application entitled "Virtual Data Storage (VDS)," Ser. No. 09/102,520, which was filed on Jun. 22, 1998, now abandoned.

FIELD OF THE INVENTION

The present invention relates to computer system data storage. More particularly, this invention relates to a virtual data storage system that can be configured to provide multiple virtual data storage devices for a single physical data storage device, and to selectively isolate at least one virtual data storage device from the computer system.

BACKGROUND OF THE INVENTION

A typical computer system generally includes one or more memory subsystems which are connected to one or more central processing units ("CPUs") either directly or through a control unit and a communications channel. The function of these memory subsystems is to store data and programs which the CPU(s) use in performing particular data processing tasks. Modern computer systems also include systems in which a relatively large computer system is formed by networking together multiple smaller computer systems.

Many types of memory subsystems are used in a variety of combinations in current computer systems. These include random access memory ("RAM"), dynamic random access memory ("DRAM"), read-only memory ("ROM"), nonvolatile memory and large-capacity storage devices for storing large quantities of data. A typical large-capacity storage device subsystem may include one or more disk drives, tape drives and/or CD-ROMs connected to the computer system through appropriate control units. A serious problem arises, however, if a memory subsystem fails or is caused to fail such that data stored therein is destroyed, corrupted and/or no longer available to the system.

Such a failure could for example be caused by a computer virus, an illegal program instruction or the failure of all or part of a disk drive's storage medium. Such failures typically cause the entire computer system to cease functioning (i.e., "crash"), and also compromise the security of all of the data stored within the computer system. These types of failures could for example destroy all stored data, the computer's operating system and/or the operating system's ability to initialize and restart (i.e., "boot") the computer. Such data failures can take any number of forms, from the slow subtle destruction of sensitive data to the instantaneous destruction of all data and software necessary to run or restart the computer system.

Computer system memory subsystems such as disk drives typically operate by communicating with the computer system's CPU(s) either directly or indirectly through an appropriate control unit. Operating disk drives in this conventional fashion normally exposes the entire contents of the disk drive storage device to spurious commands and electronic signals for the entire time the computer system is operating. As a result, during this time all of the data stored in the disk drive is exposed to destruction or corruption.

Although attempts have been made in the prior art to protect memory subsystems from unwanted corruption or destruction, none of these solutions has succeeded in providing the level of protection necessary to eliminate such risks in the case of events such as infiltration by a computer virus. In the case of disk drive storage systems in particular, none of the prior art solutions provide sufficient protection against corruption of data stored therein. This is because prior art systems do not sufficiently restrict the computer system's access to only portions of the disk drive containing data necessary for operation of the computer system by the current user or users.

For example, U.S. Pat. Nos. 5,586,301 and 5,657,470 disclose personal computer hard disk protection systems which partition hard disk drives into multiple zones, each having restricted user and application program access. U.S. Pat. No. 5,129,088 discloses a mechanism for dynamically reconfiguring such partitions based on the computer system's changing requirements. U.S. Pat. No. 5,829,053 discloses a more efficient mechanism for managing the partitioning code data which is used to control such a partitioning scheme. In addition, U.S. Pat. No. 5,519,844 discloses a RAID (Redundant Array of Inexpensive Disks) disk drive architecture for providing redundant disk drive copies of data so that, in the event that one copy is irreparably corrupted or destroyed, another undamaged copy of the data nevertheless can be retrieved. None of these protection systems, however, prevents a computer system and its operating system from accessing or communicating with certain portions of a disk drive system in the event that program data is corrupted, such as in the event of infiltration by a computer virus for example. In the event of such an infiltration, all data stored in the disk drive system could be corrupted or destroyed.

Therefore, a need has arisen for a system which will protect certain desired portions of data stored in a computer memory subsystem from spurious commands and electronic signals while the computer system is operating, thereby protecting such stored data from possible undesired destruction or corruption. The need has also arisen in particular for a system which provides such protection to a disk drive storage system, and which restricts the computer system to communicating with only those portions of data necessary for operation of the computer system by the current user or users.

SUMMARY OF THE INVENTION

It is an object of the present invention to provide a Virtual Data Storage ("VDS") System for computer memory systems which substantially eliminates or reduces the disadvantages and problems associated with the corruption and destruction of data in prior computer memory systems.

The VDS System of the present invention provides multiple virtual data storage devices for use in a computer system which contains a central processing unit ("CPU"). The VDS System includes a memory system for storing information and a VDS Controller which is in communication with the memory system and the CPU. The VDS Controller partitions the memory system into multiple virtual data storage devices, and then restricts the computer system from communicating with certain of these virtual data storage devices. The VDS Controller thus selectively isolates at least one of the virtual data storage devices from communicating with the computer system, in order to prevent corruption of information stored in at least one virtual data storage device.

In a preferred embodiment of the invention, the VDS controller provides multiple virtual data storage devices for use in a computer system which contains multiple smaller computer systems and/or computer system components and/ or multiple CPUs.

In another aspect of the invention, the VDS controller can be configured to select the quantity and size of the multiple virtual data storage devices, as well as the virtual data storage devices which are selectively isolated from communication with the computer system. In a preferred embodiment, the computer system engages in an initialization boot sequence followed by a period of normal operation. In this embodiment, the VDS Controller is configured during the computer system's initialization boot sequence, and the VDS Controller selectively isolates the selected virtual data storage devices from communication with the computer system during the computer system's period of normal operation. In yet another preferred embodiment, the computer system has multiple users, one or more of which configures the VDS Controller. In another preferred embodiment, the virtual data storage devices which are selectively isolated from communication with the computer system are determined according to the user(s) operating the computer system during the computer system's period of normal operation. In yet another preferred embodiment, the computer system engages in the initialization boot sequence when electrical power is applied to the computer system or when the computer system is reset.

In yet another aspect of the invention, the VDS Controller is configured using a stored initialization and configuration routine and stored configuration data, which the computer system can access only during the initialization boot sequence. In a preferred embodiment, the initialization and configuration routine and the configuration data are stored in the computer system's memory system.

In another aspect of the invention, the computer system used in connection with the invention is a personal computer ("PC") system, and the initialization boot sequence is a BIOS sequence. In yet another aspect of the invention, the BIOS sequence invokes the stored initialization and configuration routine for configuring the VDS controller.

In a preferred embodiment, the memory system is a disk drive storage system and the virtual data storage devices are virtual disk drives. In yet another preferred embodiment, the disk drive storage system includes multiple disk drive storage units. In yet another preferred embodiment, the VDS Controller is configured so that only one virtual data storage device can communicate with the computer system. In still another preferred embodiment, the VDS Controller is configured so that more than one virtual data storage device can communicate with the computer system.

The present invention also provides a method for providing multiple virtual data storage devices for use in a computer system which has a memory system for storing information. This method includes partitioning the memory system into multiple virtual data storage devices, and then restricting communication by the computer system to communication with only certain of the virtual data storage devices. The method of the invention thus selectively isolates at least one virtual data storage device from communication with the computer system, in order to prevent corruption of information stored in at least one virtual data storage device.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1:
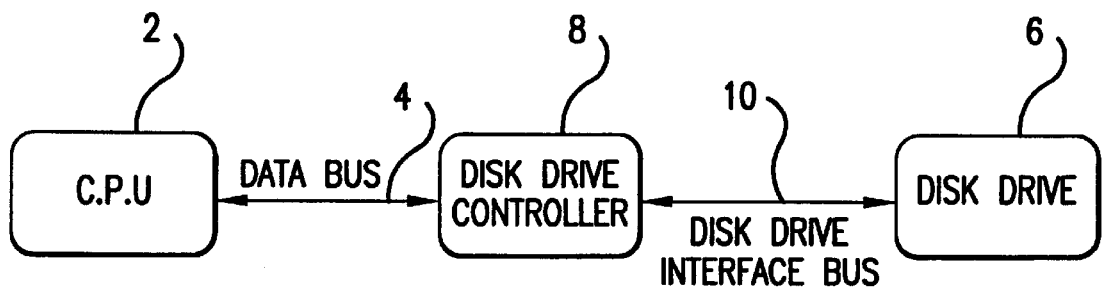
FIG. 1 is a block diagram of a prior art computer system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

The present invention can be applied to any type of memory subsystem used in computer systems. In a preferred embodiment, the present invention is utilized in connection with a large-capacity memory storage subsystem, in particular a disk drive memory subsystem.

FIG. 1 depicts a prior art computer system employing a conventional disk drive system. The computer system includes a single CPU 2 connected to a disk drive system via data bus 4. The disk drive system includes Disk Drive 6 connected to Disk Drive Controller 8 via Disk Drive Interface Bus 10. Also typically included in a prior art computer system but not shown in FIG. 1 would be a main memory subsystem and I/O (input/output) devices.

In a prior art computer system such as that depicted in FIG. 1, it is possible for CPU 2 to access the entire contents of Disk Drive 6 through Disk Drive Controller 8. That is to say, the entire contents of Disk Drive 6 is "presented" to CPU 2 by Disk Drive Controller 8. Thus in the prior art system depicted in FIG. 1, CPU 2 and the computer system directly control where on physical Disk Drive 6 data is stored and from where it is retrieved. As a result, in the event of an occurrence such as infiltration by a computer virus, all of the data stored in Disk Drive 6 could be corrupted or destroyed at any time while the computer system is operating.

Figure 2:
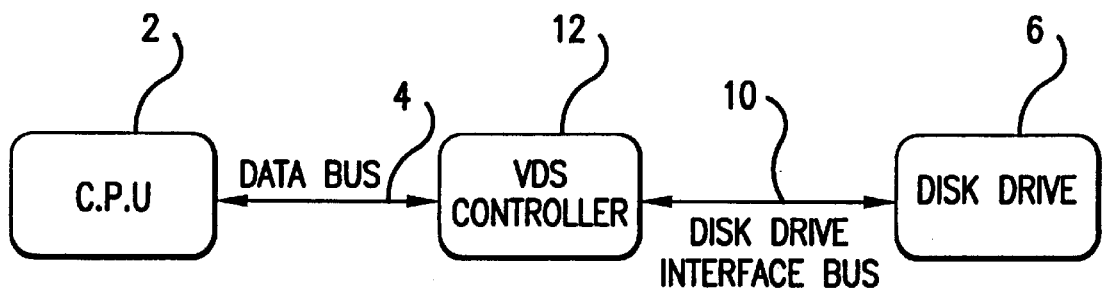
FIG. 2 is an exemplary block diagram of one embodiment of the Virtual Data Storage System of the present invention.

FIG. 2 depicts an embodiment of the present invention wherein Virtual Data Storage ("VDS") Controller 12 is substituted for Disk Drive Controller 8 and serves as the interface between CPU 2 and Disk Drive 6. VDS Controller 12 maps Disk Drive 6 into multiple virtual disk drives, as will be described in additional detail below. At any given time the computer system is operating, VDS Controller 12 presents for access by CPU 2 and the computer system only certain of these virtual disk drives. That is to say, for every attempt by CPU 2 or the computer system to access physical Disk Drive 6, VDS Controller 12 maps the access request into a corresponding request to an active virtual disk drive which has been configured by VDS Controller 12. Thus in the present invention, the VDS Controller 12, rather than CPU 2, Disk Drive Controller 8 or the computer system, controls where on physical Disk Drive 6 data is stored and from where it is retrieved.

VDS Controller 12 thus controls which portion or portions of the total storage space of Disk Drive 6 is accessible by (i.e., is presented to) CPU 2 and the computer system. Specifically, VDS Controller 12 restricts communication access by CPU 2 and the computer system to portions of Disk Drive 6 necessary for operation of the computer system by the current user or users. Thus, in the case of an event such as infiltration by a computer virus in the present invention, the only portions of Disk Drive 6 which are susceptible to possible data corruption or destruction are those portions corresponding to the virtual disk drive(s) presented by VDS Controller 12 to CPU 2 and the computer system. The remaining portions of Disk Drive 6 cannot be accessed by CPU 2 or the computer system, and the data contained therein therefore cannot be corrupted or destroyed.

In order to provide this level of protection to Disk Drive 6 even in the event of an occurrence such as a computer virus, the virtual disk drive configuration provided by VDS Controller 12 is not accessible by CPU 2 or the computer system, or any operating system program or application program being run by the computer system, during the computer system's normal operation. Rather, as discussed in additional detail below, the virtual disk drive configuration provided by VDS Controller 12 is accessible by CPU 2 and the computer system only during the computer system's initialization (i.e., boot) and configuration sequence. This access to VDS Controller 12 for purposes of configuration is accomplished using Data Bus 4 or another parallel or serial data connection (not shown) to VDS Controller 12. Alternatively, the virtual disk drive configuration provided by VDS Controller 12 could also be configured based on the position of hard-wired switches configured by the user or users.

Figure 3:
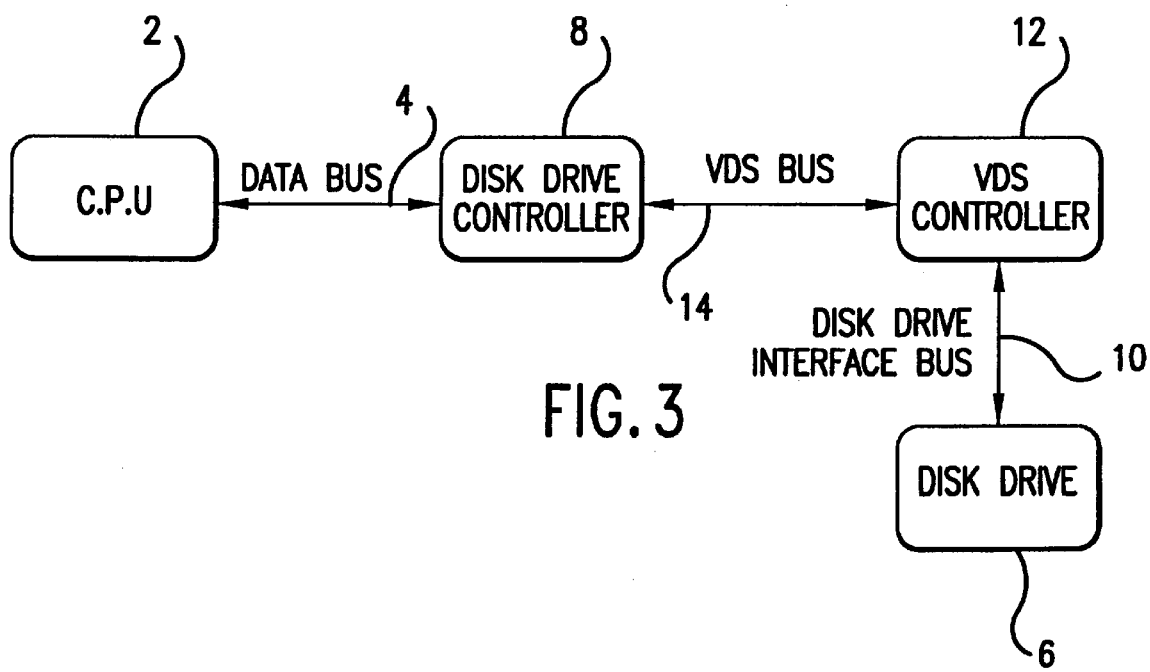
FIG. 3 is an exemplary block diagram of another embodiment of the Virtual Data Storage System of the present invention.

FIG. 3 depicts another embodiment of the present invention. The embodiment depicted in FIG. 3 is similar to that depicted in FIG. 2, except that Disk Drive Controller 8 serves as the interface between CPU 2 and VDS Controller 12, and Disk Drive Controller 8 communicates with VDS Controller 12 via VDS Bus 14. Such an embodiment would be particularly appropriate where it is necessary to interface the VDS system of the present invention to a conventional disk drive control system. Of course, in the present invention as depicted in either of FIGS. 2 or 3, VDS Controller 12 and Disk Drive 6 could be integrated into a single unit. Similarly, in the present invention as depicted in FIG. 3, VDS Controller 12 and Disk Drive Controller 8 could also be integrated into a single unit, either together with or separate from Disk Drive 6.

Although the present invention can be implemented in any type of memory subsystem in any type of computer system, the present invention is particularly well suited for use in disk drive subsystems, and more particularly for use in personal computer ("PC") disk drive subsystems. In addition, the present invention can operate with any type of industry-standard bus interface such as the IDE (Intelligent/Integrated Drive Electronics) Interface, SCSI (Small Computer System Interface) or PCI (Peripheral Component Interconnect) Bus, for example. The VDS Controller 12 could for example be a PCI card for installation in a standard PC. In a PC application of the present invention, the virtual disk drive configuration provided by VDS Controller 12 could for example be provided during the computer system's initialization (i.e., boot) sequence by the PC system's BIOS (Basic Input/Output System) routine communicating with the VDS Controller 12 via a serial or parallel data bus. This serial or parallel data bus could for example be Data Bus 4 as depicted in FIG. 2, VDS Bus 14 as depicted in FIG. 3, or another parallel or serial data connection (not shown in FIGS. 2 and 3) to VDS Controller 12, such as an RS-232 or V24 serial connection for example.

Although the embodiments of the present invention depicted in FIGS. 2–3 include only a single Disk Drive 6, other preferred embodiments include more than one Disk Drive 6. Such multiple disk drives can be configured for example in any of the numerous arrangements well known in the art. Such arrangements include for example configurations to provide redundancy, such as is provided by well-known RAID systems for example, and configurations to provide disk drive systems having very large amounts of storage. In the case of computer systems having multiple disk drives, VDS Controller 12 maps each individual Disk Drive 6 into multiple virtual disk drives or, alternatively, maps the aggregate of the multiple Disk Drive 6s into multiple virtual disk drives.

In addition, although the embodiments of the present invention depicted in FIGS. 2–3 include only a single CPU 2, other preferred embodiments include more than one CPU 2. Such multiple CPUs can be configured for example in any of the numerous arrangements well known in the art, such as in multiprocessor or distributed processor arrangements, for example. In the case of a computer system having multiple CPUs, VDS Controller 12 can be configured either to provide each CPU 2 with the same communication access to the virtual disk drives or, alternatively, can be configured to provide each CPU 2 with different communication access to the virtual disk drives.

Further, although the embodiments of the present invention depicted in FIGS. 2–3 include only a single computer system, other preferred embodiments include computer systems which are formed by networking together multiple smaller computer systems and/or computer system components. Such multiple smaller computer systems and/or components can be communicatively connected together for example in any of the numerous arrangements well known in the art, such as by any combination of a Local Area Network ("LAN"), Wide Area Network ("WAN"), encrypted secure Virtual Private Network ("VPN"), or other private secure network connection, for example. In the case of a computer system containing multiple smaller computer systems and/or components networked together, VDS Controller 12 is communicatively connected to the network connecting together the multiple smaller computer systems and/or components in order to provide each of them access to the virtual disk drives. VDS Controller 12 can be configured either to provide each of the smaller computer systems and/or components with the same communication access to the virtual disk drives or, alternatively, can be configured to provide each of the smaller computer systems and/or components with different communication access to the virtual disk drives.

The present invention enables a PC or other computer system which is periodically used by different users to provide each user with their own virtual disk drive which can be accessed only when that user is operating the computer system. This arrangement allows each user to operate the computer system using exclusively their own personal virtual disk drive. Thus, any corruption or destruction of data which occurs while that user is operating the computer system can occur only to data or programs stored in the portion of physical Disk Drive 6 corresponding to that user's virtual disk drive. No corruption or destruction can occur to data or programs stored in any other portions of physical Disk Drive 6. This arrangement of the present invention permits, for example, different family members sharing a home PC to each operate the PC using their own files, operating system and application programs, without any risk of destroying or corrupting the files, data or programs belonging to other family members.

The present invention also permits a single computer system to run multiple different operating systems depending on which virtual disk drive is active at a particular time. Similarly, a single computer user can also maintain multiple virtual disk drives if, for example, that user wishes to run different operating systems at different times of operation.

A single computer user can also maintain multiple virtual disk drives for use with different application programs and computer functions. For example, a user can use a particular virtual disk drive when connected to the Internet. Thus, in the event that the computer system is compromised by viruses or corrupted data downloaded from the Internet, the only data and programs at risk of being corrupted are those which are stored on the portion of physical Disk Drive 6 corresponding to the virtual disk drive which is active at the time.

Although use of the present invention in the manner described above requires that multiple copies of certain programs (such as operating systems and application programs, for example) be maintained, the resulting higher memory demands in exchange for the increased system security provided is not problematic in view of the relative large size and low cost of modern disk drive subsystems. As disk drive subsystems continue to become increasingly large and less expensive, the benefits provided by the present invention will continue to become even more attractive.

Implementation of the present invention will now be discussed in additional detail. As is well known in the art, modern disk drives such as Disk Drive 6 depicted in FIGS. 2 and 3 are typically mapped into multiple blocks. Access to the disk drive is accomplished by specifying the block number or numbers being accessed. Such accessing schemes are well known in the prior art, and are disclosed for example in U.S. Pat. No. 5,519,844, the entirety of which is incorporated herein by reference.

Referring to FIGS. 2 and 3 and as will be discussed below in additional detail in connection with FIG. 6, VDS Controller 12 generates the virtual disk drive configuration by first determining from Disk Drive(s) 6 the number of storage blocks contained therein. VDS Controller 12 then determines from user input the number of virtual disk drives to be configured, the number of blocks in each such virtual disk drive, and the virtual disk drive which is to be active. VDS Controller 12 then generates a map of the virtual disk drive blocks to the physical disk drive blocks located on physical Disk Drive 6. Any data and required program instructions for implementing the virtual disk drive configuration are stored in a section of memory unable to be accessed or altered by CPU 2 or the computer system once the computer system has completed its initialization (i.e., boot) sequence and begins normal operation. In a preferred embodiment, this memory can be nonvolatile memory, such as nonvolatile RAM ("NVRAM") for example.

Figure 4:
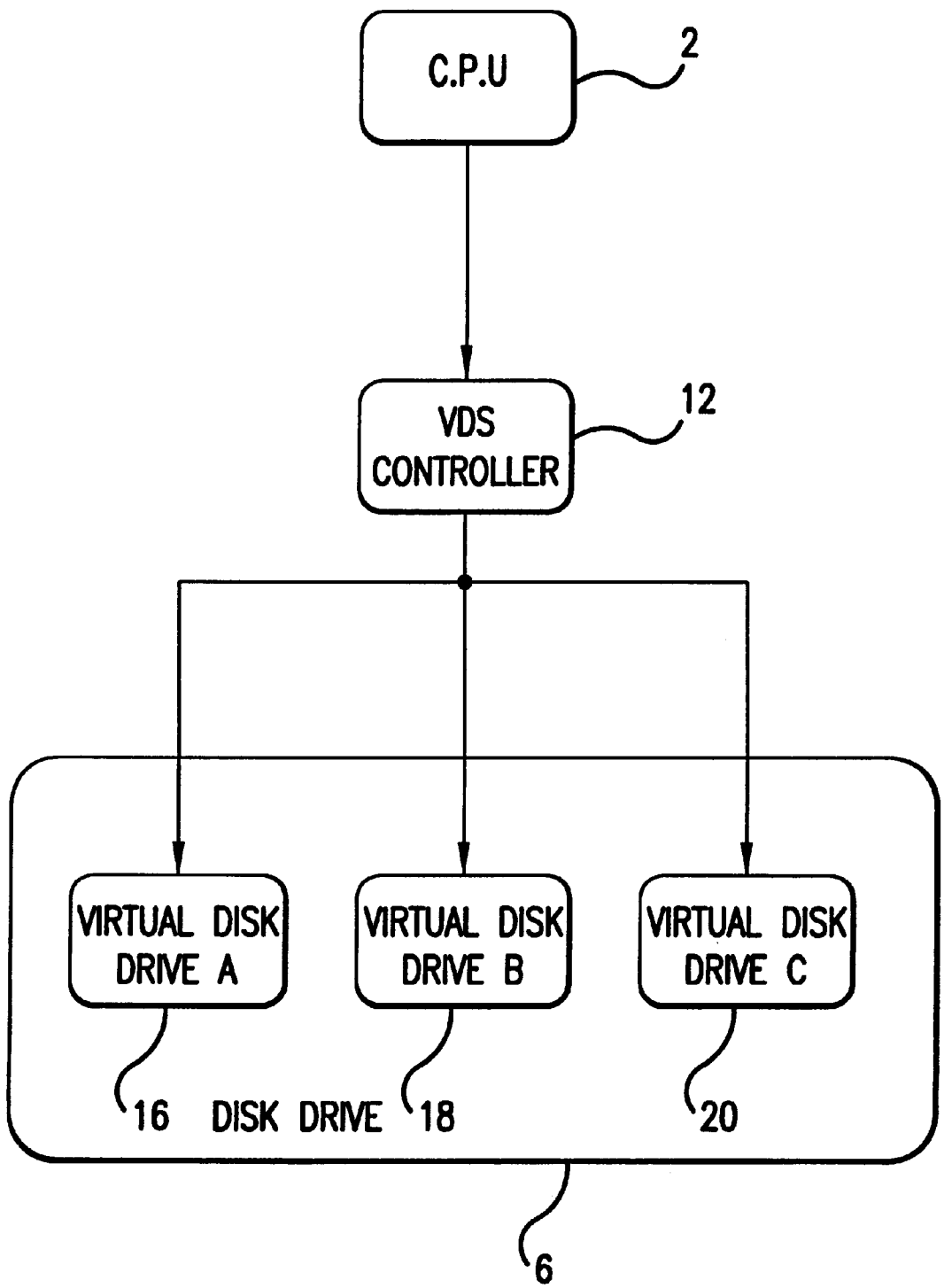
FIG. 4 is an exemplary block diagram depicting a physical disk drive and multiple virtual disk drives in an embodiment of the Virtual Data Storage System of the present invention.

Table 1 below and FIG. 4 represent an example of a virtual disk drive configuration mapping scheme for a physical Disk Drive 6 containing 1000 blocks of storage space mapped into 3 virtual disk drives. The 3 virtual disk drives, Virtual Disk Drive A 16, Virtual Disk Drive B 18 and Virtual Disk Drive C 20, contain 300, 500 and 200 blocks of storage space, respectively.

TABLE 1

| | Virtual Block Numbers Presented to CPU and Computer System | VDS Controller Mapping Offset (in blocks) | Size of Virtual Disk Drive (in blocks) | Corresponding Physical Block Numbers |
|---|---|---|---|---|
| Virtual Disk Drive A | 0–299 | 0 | 300 | 0–299 |
| Virtual Disk Drive B | 0–499 | 300 | 500 | 300–799 |
| Virtual Disk Drive C | 0–199 | 800 | 200 | 800–999 |

As depicted above in Table 1, if Virtual Disk Drive A 16 is active, VDS Controller 12 presents only that virtual disk drive to CPU 2 and the computer system. Accordingly, when Virtual Disk Drive A 16 is active, VDS Controller 12 presents to CPU 2 and the computer system only virtual block numbers 0–299, which correspond to physical block numbers 0–299 of physical Disk Drive 6. In this case, as can be seen in Table 1, VDS Controller 12 uses an offset of 0 blocks to map the virtual disk drive blocks to the physical disk drive blocks.

Similarly, if Virtual Disk Drive B 18 is active, VDS Controller 12 presents only that virtual disk drive to CPU 2 and the computer system. In this case, as can be seen from Table 1, VDS Controller 12 presents to CPU 2 and the computer system only virtual block numbers 0–499, which correspond to physical block numbers 300–799 of physical Disk Drive 6. When Virtual Disk Drive B 18 is active, VDS Controller 12 uses an offset of 300 blocks to map the virtal disk drive blocks to the physical disk drive blocks.

If Virtual Disk Drive C 20 is active, VDS Controller 12 presents only that virtual disk drive to CPU 2 and the computer system. In this case, VDS Controller 12 presents to CPU 2 and the computer system only virtual block numbers 0–199, which correspond to physical block numbers 800–999 of physical Disk Drive 6. In this case, as can be seen in Table 1, VDS Controller 12 uses an offset of 800 blocks to map the virtual disk drive blocks to the physical disk drive blocks.

Figure 5:
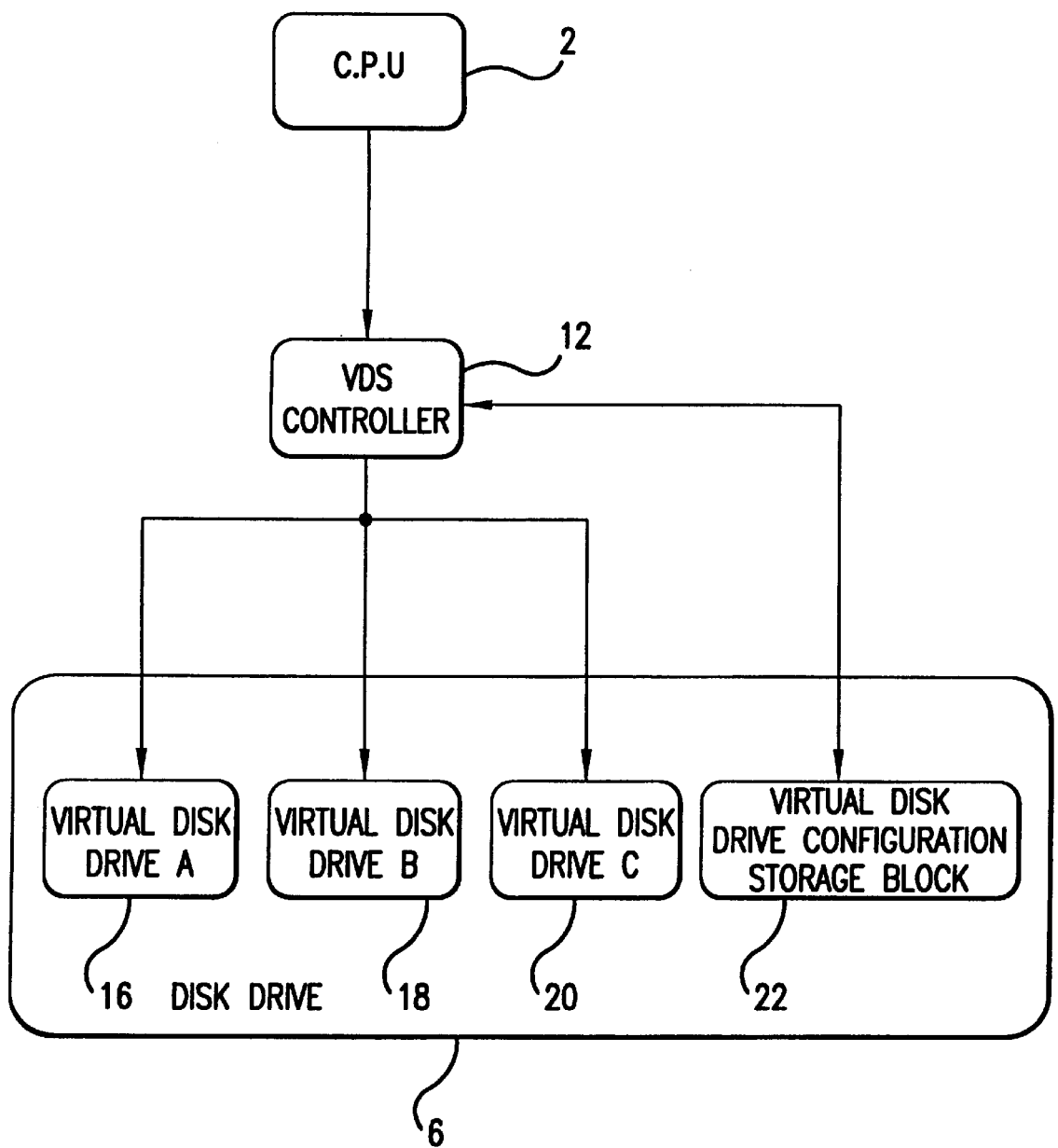
FIG. 5 is an exemplary block diagram depicting a physical disk drive and multiple virtual disk drives in another embodiment of the Virtual Data Storage System of the present invention.

Table 2 and FIG. 5 depict a preferred embodiment of the virtual disk drive configuration similar to that depicted in Table 1 and FIG. 4. In the embodiment depicted in Table 2 and FIG. 5, the data and any required program instructions for implementing the virtual disk drive configuration are stored on Disk Drive 6, rather than in some other area of memory.

TABLE 2

| | Virtual Block Numbers Presented to CPU and Computer System | VDS Controller Mapping Offset (in blocks) | Size of Virtual Disk Drive (in blocks) | Corresponding Physical Block Numbers |
|---|---|---|---|---|
| Virtual Disk Drive A | 0–299 | 0 | 300 | 0–299 |
| Virtual Disk Drive B | 0–499 | 300 | 500 | 300–799 |

TABLE 2-continued

| Virtual Block Numbers Presented to CPU and Computer System | VDS Controller Mapping Offset (in blocks) | Size of Virtual Disk Drive (in blocks) | Corresponding Physical Block Numbers |
|---|---|---|---|
| Virtual Disk Drive C | 0–198 | 800 | 199 | 800–998 |
| Virtual Disk Drive Configuration Storage Block | None | 999 | 1 | 999 |

The virtual disk drive configuration depicted in Table 2 and FIG. 5 is the same as that depicted in Table 1 and FIG. 4, except that 1 block of physical disk space (physical block number 999), namely Virtual Disk Drive Configuration Storage Block 22, is used to store the data and any required program instructions for implementing the virtual disk drive configuration provided by VDS Controller 12. In addition, in order to accommodate this, Virtual Disk Drive C 20 is 1 block smaller and therefore comprises virtual block numbers 1–198, which correspond to physical block numbers 800–998 of physical Disk Drive 6. As can be seen in Table 2, VDS Controller 12 uses an offset of 999 blocks to map the Virtual Disk Drive Configuration Storage Block 22 to the physical disk drive block number 999.

The Virtual Disk Drive Configuration Storage Block 22 is not accessible by CPU 2 or the computer system once the computer system has completed its initialization (i.e., boot) sequence. Thus as shown in Table 2, during normal computer operation the Virtual Disk Drive Configuration Storage Block 22 is not accessible by, and therefore is not presented by VDS Controller 12 to, the CPU 2 or the computer system. Of course, although the Virtual Disk Drive Configuration Storage Block 22 comprises only one block of storage space in the example depicted in Table 2 and FIG. 5, this Configuration Block can be of any size.

During normal computer operation, the above-described mapping operations of the present invention and VDS Controller 12 are transparent to CPU 2 and the computer system. That is to say, VDS Controller 12 communicates with the computer system in the same way as does Disk Drive Controller 8 in prior art computer systems, such as that depicted in FIG. 1.

In other embodiments of the present invention, certain virtual disk drives may be designated to be shared by more than one user. In addition, and if appropriate, virtual disk drive configurations such as those depicted in Tables 1–2 and FIGS. 4–5 can activate more than one virtual disk drive at the same time. Such an arrangement might be desirable if for example the user or users share certain virtual disk drives, and/or wish to access data or application programs stored in more than one virtual disk drive to which they are entitled access.

Figure 6A:
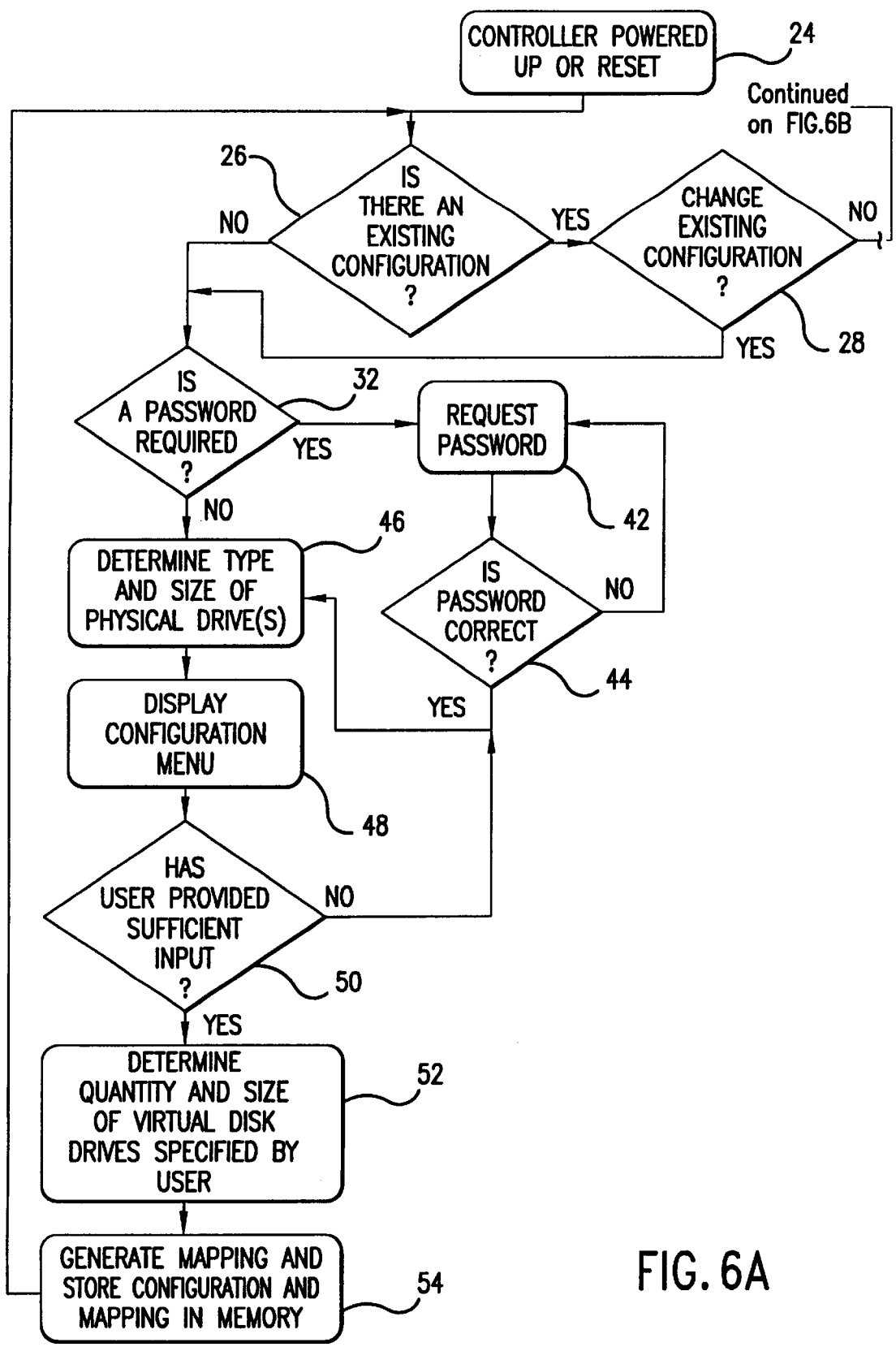
FIG. 6 is an exemplary process flow diagram depicting a virtual disk drive initialization and configuration routine of the Virtual Data Storage System of the present invention.
Figure 6B:
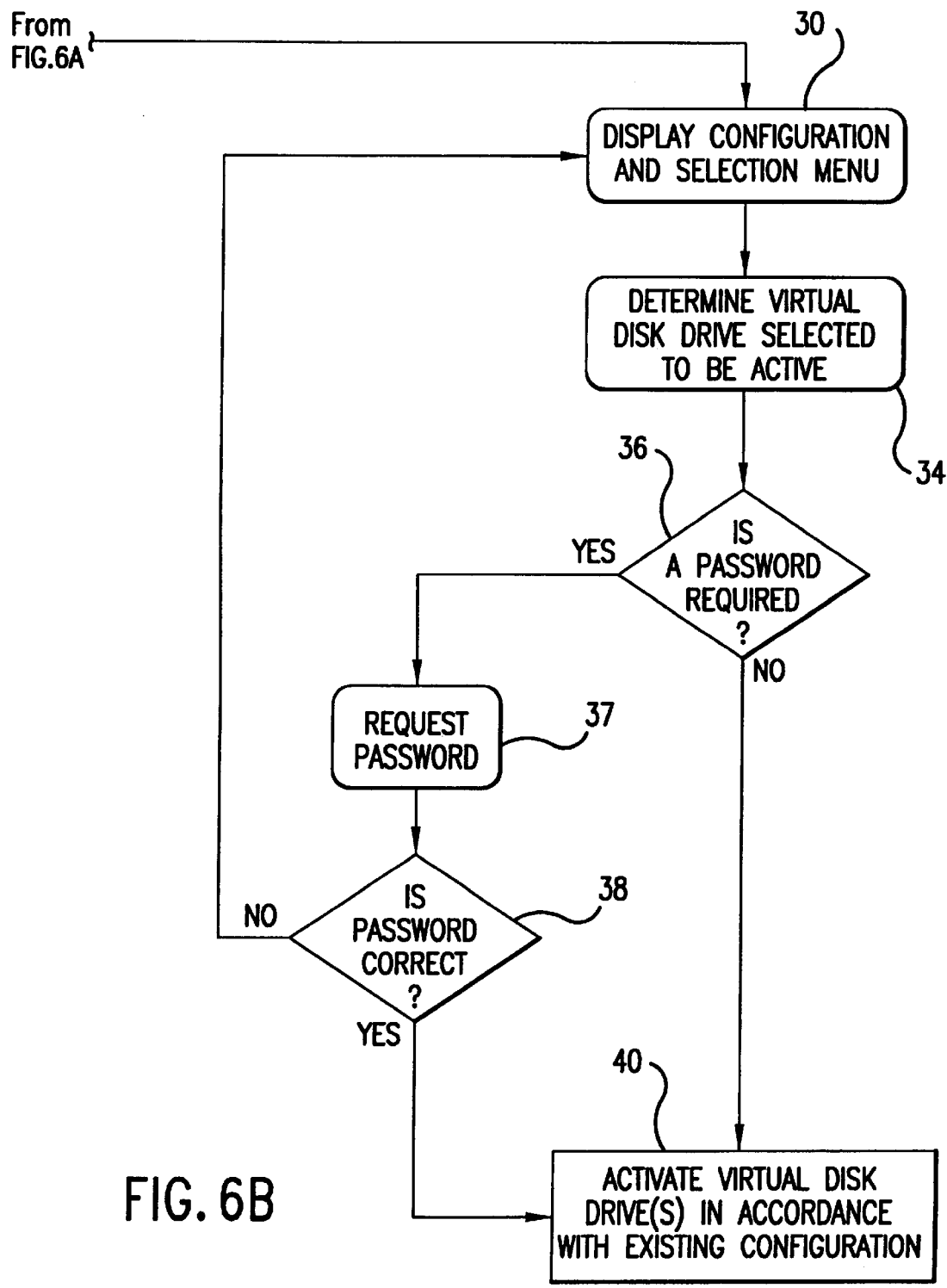

FIG. 6 depicts an exemplary process flow for the initialization and configuration of the present invention, beginning with Block 24. As shown in Block 24, the process depicted in FIG. 6 is performed by VDS Controller 12 when the computer system is either powered up or reset as part of the computer system's initialization (i.e., boot) sequence. At the beginning of the process depicted in FIG. 6, it should also be noted that VDS Controller 12 can optionally perform a self-test routine.

As shown in Block 26, VDS Controller 12 then determines whether there is an existing virtual disk drive configuration, such at those depicted in Tables 1–2. As shown in Block 28, if there is an existing configuration and no changes to the configuration are required by the user, then the VDS Controller 12 proceeds to determine which virtual disk drive should be made active, beginning with Block 30. Otherwise, the VDS Controller 12 queries the user to determine whether a new virtual disk drive configuration is to be provided, beginning with Block 32.

If there is an existing configuration and no changes are required, VDS Controller 12 displays for the user a representation of the configuration, as well as a means for selecting the desired virtual disk drive(s) which are to be active, as shown in Block 30. The user or users could for example make this selection in the form of a User I.D. input by way of a computer keyboard or mouse. Alternatively, this selection could be made by way of a user-configured hardwired switch. As shown in Block 34, VDS Controller 12 then determines which virtual disk drive(s) have been selected to be active by the user or users.

As shown in Blocks 36–38, VDS Controller 12 typically will require a login password in order to activate the virtual disk drive(s) which have been selected by the user. This type of security precaution ensures that users cannot gain access to virtual disk drives which they are not authorized to use. If the user cannot provide the required login password, VDS Controller 12 once again attempts to determine from the user which virtual disk drive should be made active, as shown in Block 30. If on the other hand the user provides the required login password, VDS Controller 12 then proceeds to activate the virtual disk drive(s) selected by the user, in accordance with the existing virtual disk drive configuration provided by VDS Controller 12, as shown in Block 40.

As shown in Blocks 26 and 28, if there is no existing virtual disk drive configuration, or the user wishes to change the existing configuration, then VDS Controller 12 proceeds with a configuration routine, beginning with Block 32, to determine and then generate a new virtual disk drive configuration, such as those depicted in Tables 1–2 and FIGS. 4–5. As shown in Blocks 32, 42 and 44, VDS Controller 12 typically will require a login password before a user is permitted to generate a new virtual disk drive configuration. This security precaution ensures that users cannot gain access to virtual disk drives which they are not authorized to use, and that unauthorized users cannot generate a new virtual disk drive configuration.

If the user provides the required login password, VDS Controller 12 first determines the type and size of the physical Disk Drive(s) 6 installed in the computer system, as shown in Block 46. This can be accomplished for example by testing for any connected physical Disk Drive(s) 6, and by then querying the disk information files to determine the size and type of each Disk Drive 6. This can be accomplished for example by using Disk Drive Interface Bus 10 or, in a PC-based embodiment of the present invention, a SCSI bus interface to Disk Drive 6, for example.

As shown in Block 48, VDS Controller 12 then provides the user with a configuration menu which prompts the user to specify the quantity of virtual disk drives desired, and the size of each such virtual disk drive. The user could for example input this information using a computer keyboard or mouse. Alternatively, this information could be provided by user-configured hardwired switches.

The configuration menu of course will not accept from the user any configurations in which the combined size of all of the virtual disk drives exceeds the size of the physical Disk Drive(s) 6 present in the computer system. As shown in Blocks 48, 50 and 52, VDS Controller 12 continues to display the configuration menu until the user has provided sufficient input for VDS Controller 12 to determine the quantity and size of the virtual disk drives specified by the user.

Once this has been accomplished, as shown in Block 54, VDS Controller 12 generates a virtual disk drive configuration and mapping scheme such as those depicted in Tables 1–2, for example. As also shown in Block 54, VDS Controller 12 also stores this configuration and mapping scheme in the computer system's memory. Once this has been accomplished, and as discussed above, VDS Controller 12 then determines whether any changes are required to the existing configuration, as shown in Blocks 26 and 28. If not, VDS Controller 12 then determines which virtual disk drive should be made active, beginning with Block 30, and as described above.

Once the virtual disk drive(s) selected by the user have been activated in accordance with an established virtual disk drive configuration as shown in Block 40 of FIG. 6, the computer system begins its normal operation via the operating system resident on the virtual disk drive which has been activated. During the computer system's normal operation, VDS Controller 12 emulates a conventional disk drive subsystem of the same size as the active virtual disk drive. VDS Controller 12 operates in this manner until the computer system is either reset or powered up again. During the computer system's normal operation, CPU 2 and the computer system cannot access or alter either the process depicted in FIG. 6 or the stored configuration data for implementing the existing virtual disk drive configuration. As shown in Block 24, CPU 2 and the computer system will not be able to access or alter this process and data unless the computer system is reset or powered up.

In a preferred embodiment of the present invention, the virtual disk drive initialization and configuration routine depicted in FIG. 6 is stored in memory in the computer system. When the computer system is first powered on, the initialization (i.e., boot) sequence executes the routine of FIG. 6 to generate and implement the appropriate virtual disk drive configuration and mapping scheme. The data necessary to implement this configuration and mapping scheme is likewise stored in the computer system's memory, preferably in the same area of memory as the routine of FIG. 6 is stored.

Once the routine depicted in FIG. 6 is complete and the virtual disk drive configuration has been established and implemented, the routine relinquishes control of the computer system to the operating system which resides on the virtual disk drive which has been activated. Once this occurs, the data and program instructions for implementing the virtual disk drive configuration are no longer accessible by CPU 2 or the computer system. Accordingly, these data and program instructions cannot be corrupted or destroyed, even in the case of an event such as infiltration by a computer virus.

In a preferred embodiment of the present invention, VDS Controller 12 includes a one-time-writeable register which can be written to only once after the computer system is reset or powered up, and thereafter cannot be written to again unless the computer system is again reset or powered up. During the routine depicted in FIG. 6 which is initiated upon reset or power up of the computer system, certain data necessary to implement the virtual disk drive configuration and mapping scheme are written or copied from the computer system's memory into this one-time-writeable register. After this has occurred, the data stored in this register cannot be altered or overwritten, unless the computer system is again reset or powered up, and the routine depicted in FIG. 6 is thus initiated. These stored data could represent, for example, certain of the binary bits used to address Disk Drive 6. With certain of these addressing bits determined solely in accordance with the contents of the one-time-writeable register, certain portions of Disk Drive 6 necessarily would not be accessible by CPU 2 or the computer system.

In this preferred embodiment, the one-time-writeable register for example has data inputs for receiving the above-mentioned certain data necessary to implement the virtual disk drive configuration and mapping scheme, and outputs representing for example certain of the binary bits used to address Disk Drive 6. The register also for example has an input connected to the computer system's hardware reset signal, and a write-enable input which is for example activated by the routine depicted in FIG. 6 in order to write the necessary data into the one-time-writeable register. Irrespective of the state of this write-enable input however, the register can be written to only one time following activation of the computer system's hardware reset, which occurs only in the event the computer system is reset or powered up. In a preferred embodiment, the one-time-writeable register is implemented using for example a conventional latch or flip-flop in combination with logic gates, arranged to permit the output of the latch or flip-flop to change only in the event a hardware reset has occurred.

In another preferred embodiment of the present invention, the computer system is a PC system and the routine depicted in FIG. 6 and the data for implementing the virtual disk drive configuration are stored on Disk Drive 6 in the Virtual Disk Drive Configuration Storage Block 22 depicted in Table 2 and FIG. 5. In such a preferred embodiment, the PC BIOS initialization (i.e., boot) sequence directs the instruction counter of CPU 2 to begin executing the program instructions contained in the routine of FIG. 6. This could be accomplished for example by altering the BIOS sequence so that CPU 2 begins executing instructions at the memory location where the FIG. 6 routine is stored.

Alternatively, in another preferred embodiment, the BIOS sequence need not be altered. In such a preferred embodiment, the routine of FIG. 6 is stored on Disk Drive 6 beginning at the same memory location where the BIOS sequence of a prior art PC system would normally direct the instruction counter of CPU 2 to begin executing the program instructions which constitute the operating system. Thus in this preferred embodiment of the present invention, rather than the BIOS sequence directing CPU 2 to begin executing the operating system as in prior art systems, the BIOS sequence instead directs CPU 2 to begin executing the virtual disk drive initialization and configuration routine depicted in FIG. 6. Once this routine has completed executing, it in turn directs CPU 2 to begin executing the operating system resident on the virtual disk drive which the routine has activated. The computer system then begins its normal operation.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A virtual data storage system for providing a plurality of virtual data storage devices for use in a computer system having a central processing unit, wherein said computer system has an initialization operation and a normal operation, the virtual data storage system comprising:

a memory system for storing information; and a virtual data storage controller in communication with said memory system and with said central processing unit of said computer system, said controller being capable of partitioning physical memory address space of said memory system into a plurality of virtual data storage devices, each said virtual data storage device comprising a separate portion of said physical memory address space determined in accordance with a memory mapping of said physical memory address space into said virtual data storage devices, said memory mapping having an offset corresponding to each said virtual data storage device and causing fewer than said plurality of virtual data storage devices to be presented to said computer system during said normal operation, said controller also being capable of utilizing said memory mapping and said offsets to restrict communication by said computer system during said normal operation to communication with fewer than said plurality of virtual data storage devices, in order to selectively isolate at least one said virtual data storage device and its corresponding physical memory address space from communication with said computer system, wherein at no time during said normal operation can said computer system communicate with said at least one said virtual data storage device and its corresponding physical memory address space, thereby preventing corruption of information stored in said at least one virtual data storage device.

2. The virtual data storage system of claim 1, wherein said memory system comprises a disk drive storage system, and wherein said virtual data storage devices comprise virtual disk drives.

3. The virtual data storage system of claim 2, wherein said disk drive storage system comprises a plurality of disk drive storage units.

4. The virtual data storage system of claim 1, wherein each said virtual data storage device is of a size which can be selected, and wherein said controller is configured to select a quantity of said virtual data storage devices, to select said size for each said virtual data storage device, and to select said virtual data storage devices which are selectively isolated from communication with said computer system.

5. The virtual data storage system of claim 4, wherein said controller is configured exclusively during said initialization operation.

6. The virtual data storage system of claim 5, wherein said computer system comprises a personal computer system, and wherein said initialization operation comprises a BIOS initialization boot sequence.

7. The virtual data storage system of claim 5, wherein said computer system has a plurality of users, and wherein said controller is configured by one or more said users during said initialization operation of said computer system, and wherein said virtual data storage devices selectively isolated from communication with said computer system are determined according to the user operating said computer system during said period of normal operation.

8. The virtual data storage system of claim 5, wherein said computer system is arranged to engage in said initialization operation when electrical power is applied to said computer system or when said computer system is reset.

9. The virtual data storage system of claim 5, wherein said controller is configured using a stored initialization and configuration routine and stored configuration data, wherein said computer system is arranged to access said stored initialization and configuration routine and said stored configuration data only during said initialization operation of said computer system.

10. The virtual data storage system of claim 9, wherein said initialization and configuration routine and said configuration data are stored in said memory system of said computer system.

11. The virtual data storage system of claim 9, wherein said computer system comprises a personal computer system and wherein said initialization operation of said computer system comprises a BIOS initialization boot sequence, and wherein said stored initialization and configuration routine for configuring said controller is invoked by said BIOS initialization boot sequence.

12. The virtual data storage system of claim 4, wherein said controller is configured so that only one of said plurality of virtual data storage devices can communicate with said computer system.

13. The virtual data storage system of claim 4, wherein said controller is configured so that more than one of said plurality of virtual data storage devices can communicate with said computer system.

14. The virtual data storage system of claim 1, wherein said memory system comprises random access memory.

15. The virtual data storage system of claim 1, wherein said memory system comprises nonvolatile memory.

16. A method for providing a plurality of virtual data storage devices for use in a computer system having a memory system for storing information, wherein said computer system has an initialization operation and a normal operation, comprising the steps of:

partitioning physical memory address space of said memory system into a plurality of virtual data storage devices, each said virtual data storage device comprising a separate portion of said physical memory address space determined in accordance with a memory mapping of said physical memory address space into said virtual data storage devices, said memory mapping having an offset corresponding to each said virtual data storage device and causing fewer than said plurality of virtual data storage devices to be presented to said computer system during said normal operation; and utilizing said memory mapping and said offsets to restrict communication by said computer system during said normal operation to communication with fewer than said plurality of virtual data storage devices, in order to selectively isolate at least one said virtual data storage device and its corresponding physical memory address space from communication with said computer system, wherein at no time during said normal operation can said computer system communicate with said at least one said virtual data storage device and its corresponding physical memory address space, thereby preventing corruption of information stored in said at least one virtual data storage device.

17. The method of claim 16, wherein said memory system comprises a disk drive storage system, and wherein said virtual data storage devices comprise virtual disk drives.

18. The method of claim 16, further comprising the steps of:

selecting a quantity of said virtual data storage devices;
selecting a size for each said virtual data storage device; and selecting said virtual data storage devices which are selectively isolated from communication with said computer system.

19. The method of claim 18, wherein said steps of selecting said quantity of said virtual data storage devices, selecting said size for each said virtual data storage device, and selecting said virtual data storage devices which are selectively isolated from communication with said computer system, are performed exclusively during said initialization operation.

20. The method of claim 19, wherein said computer system comprises a personal computer system, and wherein the step of engaging in said initialization operation comprises the step of engaging in a BIOS initialization boot sequence.

21. The method of claim 19, wherein said computer system has a plurality of users, and wherein said steps of selecting said quantity of said virtual data storage devices and selecting said size for each said virtual data storage device are performed by one or more said users, and wherein said step of selecting said virtual data storage devices which are selectively isolated from communication with said computer system is determined according to the users operating said computer system during said normal operation.

22. A virtual data storage system for providing a plurality of virtual disk drives for use in a computer system having a central processing unit and a plurality of users, the computer system being arranged to engage in an initialization boot sequence followed by a period of normal operation, the virtual data storage system comprising:
   a disk drive storage system for storing information; and
   a virtual data storage controller in communication with said disk drive storage system and with said central processing unit of said computer system, said controller being capable of partitioning physical memory address space of said disk drive storage system into a plurality of virtual disk drives, each said virtual disk drive comprising a separate portion of said physical memory address space determined in accordance with a memory mapping of said physical memory address space into said virtual disk drives, said memory mapping having an offset corresponding to each said virtual disk drive and causing fewer than said plurality of virtual disk drives to be presented to said computer system during said period of normal operation, wherein said controller is configured by one or more said users during said initialization boot sequence to select a quantity of said virtual disk drives, to select a size for each said virtual disk drive, and to generate said memory mapping and said offsets to restrict during the entirety of said period of normal operation communication by said computer system to communication with fewer than said plurality of virtual disk drives, in order to selectively isolate at least one said virtual disk drive and its corresponding physical memory address space from communication with said computer system during the entirety of said period of normal operation, said at least one virtual disk drive being determined according to the user operating said computer system during said period of normal operation, wherein at no time during said period of normal operation can said computer system communicate with said at least one said virtual disk drive and its corresponding physical memory address space, thereby preventing corruption of information stored in said at least one virtual disk drive.

23. The virtual data storage system of claim 22, wherein said controller is configured using a stored initialization and configuration routine and stored configuration data, wherein said computer system is arranged to access said stored initialization and configuration routine and said stored configuration data only during said initialization boot sequence of said computer system.

24. A virtual data storage system for providing a plurality of virtual data storage devices for use in at least one computer system, said at least one computer system having a plurality of central processing units, wherein said computer system has an initialization operation and a normal operation, the virtual data storage system comprising:
   a memory system for storing information; and
   a virtual data storage controller in communication with said memory system and with said central processing units of said computer system, said controller being capable of partitioning physical memory address space of said memory system into a plurality of virtual data storage devices, each said virtual data storage device comprising a separate portion of said physical memory address space determined in accordance with a memory mapping of said physical memory address space into said virtual data storage devices, said memory mapping having an offset corresponding to each said virtual data storage device and causing fewer than said plurality of virtual data storage devices to be presented to said computer system during said normal operation, said controller also being capable of utilizing said memory mapping and said offsets to restrict communication by said computer system during said normal operation to communication with fewer than said plurality of virtual data storage devices, in order to selectively isolate at least one said virtual data storage device and its corresponding physical memory address space from communication with said computer system, wherein at no time during said normal operation can said computer system communicate with said at least one said virtual data storage device and its corresponding physical memory address space, thereby preventing corruption of information stored in said at least one virtual data storage device.

25. The virtual data storage system of claim 24, wherein said memory system comprises a disk drive storage system, and wherein said virtual data storage devices comprise virtual disk drives.

26. The virtual data storage system of claim 25, wherein said disk drive storage system comprises a plurality of disk drive storage units.

27. The virtual data storage system of claim 24, wherein each said virtual data storage device is of a size which can be selected, and wherein said controller is configured to select a quantity of said virtual data storage devices, to select said size for each said virtual data storage device, and to select said virtual data storage devices which are selectively isolated from communication with said computer system.

28. The virtual data storage system of claim 27, wherein said controller is configured exclusively during said initialization operation.

29. The virtual data storage system of claim 28, wherein said computer system comprises a personal computer system, and wherein said initialization operation comprises a BIOS initialization boot sequence.

30. The virtual data storage system of claim 28, wherein said computer system has a plurality of users, and wherein said controller is configured by one or more said users during said initialization operation of said computer system, and wherein said virtual data storage devices selectively isolated from communication with said computer system are determined according to the user operating said computer system during said period of normal operation.

31. The virtual data storage system of claim 28, wherein said computer system is arranged to engage in said initialization operation when electrical power is applied to said computer system or when said computer system is reset.

32. The virtual data storage system of claim 28, wherein said controller is configured using a stored initialization and configuration routine and stored configuration data, wherein said computer system is arranged to access said stored initialization and configuration routine and said stored configuration data only during said initialization operation of said computer system.

33. The virtual data storage system of claim 32, wherein said initialization and configuration routine and said configuration data are stored in said memory system of said computer system.

34. The virtual data storage system of claim 32, wherein said computer system comprises a personal computer system and wherein said initialization operation of said computer system comprises a BIOS initialization boot sequence, and wherein said stored initialization and configuration routine for configuring said controller is invoked by said BIOS initialization boot sequence.

35. The virtual data storage system of claim 27, wherein said controller is configured so that only one of said plurality of virtual data storage devices can communicate with each of said at least one computer system.

36. The virtual data storage system of claim 27, wherein said controller is configured so that more than one of said plurality of virtual data storage devices can communicate with each of said at least one computer system.

37. The virtual data storage system of claim 24, wherein said memory system comprises random access memory.

38. The virtual data storage system of claim 24, wherein said memory system comprises nonvolatile memory.

39. The virtual data storage system of claim 27, wherein said controller is configured so that said virtual data storage devices which are selectively isolated from communication with said computer system are isolated from communication with all of said plurality of said central processing units.

40. The virtual data storage system of claim 27, wherein said controller is configured so that said virtual data storage devices which are selectively isolated from communication with said computer system are isolated from communication with fewer than all of said plurality of said central processing units.

41. The virtual data storage system of claim 27, wherein said at least one computer system comprises a plurality of computer systems communicatively connected together by a communications network.

42. The virtual data storage system of claim 41, wherein said controller is configured so that said virtual data storage devices which are selectively isolated from communication with said at least one computer system are isolated from communication with all of said plurality of said computer systems.

43. The virtual data storage system of claim 41, wherein said controller is configured so that said virtual data storage devices which are selectively isolated from communication with said at least one computer system are isolated from communication with fewer than all of said plurality of said computer systems.

44. The virtual data storage system of claim 27, wherein said at least one computer system comprises a plurality of computer system components communicatively connected together by a communications network.

45. The virtual data storage system of claim 44, wherein said controller is configured so that said virtual data storage devices which are selectively isolated from communication with said at least one computer system are isolated from communication with all of said plurality of said computer system components.

46. The virtual data storage system of claim 44, wherein said controller is configured so that said virtual data storage devices which are selectively isolated from communication with said at least one computer system are isolated from communication with fewer than all of said plurality of said computer system components.

47. In a computer system having a memory system for storing information, a central processing unit and programs stored in said memory, wherein said computer system has an initialization operation and a normal operation, the improvement wherein there is provided a memory controller for partitioning physical memory address space of said memory into a plurality of virtual memories, each said virtual memory comprising a separate portion of said physical memory address space determined in accordance with a memory mapping of said physical memory address space into said virtual memories, said memory mapping having an offset corresponding to each said virtual memory and causing fewer than said plurality of virtual memories to be presented to said computer system during said normal operation, said memory controller also utilizing said memory mapping and said offsets to restrict communication by said central processing unit during said normal operation to prevent communication with at least one of said virtual memories and its corresponding physical memory address space, wherein at no time during said normal operation can said central processing unit communicate with said at least one of said virtual memories and its corresponding physical memory address space.

48. The improvement specified in claim 47 wherein each of said virtual memories comprises a contiguous portion of said physical memory address space.

49. The improvement specified in claim 47 wherein said memory controller restricts communication by said central processing unit during said normal operation to permit communication with only one of said virtual memories.

50. The improvement specified in claim 47 wherein programs are stored in a plurality of said virtual memories.

51. The improvement specified in claim 47 wherein said controller restricts communication by restricting the addresses that can be presented to said memory.

* * * * *